US 11,986,896 B2

(12) United States Patent
Harada

(10) Patent No.: US 11,986,896 B2
(45) Date of Patent: May 21, 2024

(54) THREAD FORMING TAP

(71) Applicant: OSG CORPORATION, Toyokawa (JP)

(72) Inventor: Kazumitsu Harada, Toyokawa (JP)

(73) Assignee: OSG CORPORATION, Toyokawa (JP)

(*) Notice: Subject to any disclaimer, the term of this patent is extended or adjusted under 35 U.S.C. 154(b) by 715 days.

(21) Appl. No.: 16/981,083

(22) PCT Filed: May 31, 2018

(86) PCT No.: PCT/JP2018/020958
§ 371 (c)(1),
(2) Date: Sep. 15, 2020

(87) PCT Pub. No.: WO2019/229932
PCT Pub. Date: Dec. 5, 2019

(65) Prior Publication Data
US 2021/0023637 A1 Jan. 28, 2021

(51) Int. Cl.
*B23G 7/02* (2006.01)

(52) U.S. Cl.
CPC ............ *B23G 7/02* (2013.01); *B23G 2200/34* (2013.01)

(58) Field of Classification Search
CPC ... B23G 5/06; B23G 5/18; B23G 7/02; B23G 7/00; B23G 9/09; B23G 2200/10; B23G 2200/12; B23G 2200/28; B23G 2200/30; B23G 2200/34; B23G 2200/44; Y10T 408/9048
See application file for complete search history.

(56) References Cited

U.S. PATENT DOCUMENTS 1,961,003 A * 5/1934 Lamond ................... B23G 5/06
408/219
3,069,961 A 12/1962 Baubles
(Continued)

FOREIGN PATENT DOCUMENTS

JP          S35-9549 B1     7/1960
JP       2004-276085 A    10/2004
(Continued)

OTHER PUBLICATIONS

WO-2016030100-A1 Machine Translation (Year: 2016).*
(Continued)

*Primary Examiner* — Eric A. Gates
(74) *Attorney, Agent, or Firm* — Oliff PLC

(57) ABSTRACT

A thread forming tap including a complete thread portion and a leading portion that are provided with an external thread. A thread ridge of the external thread has, in an axial cross section, a triangular shape that is defined by a pair of flanks located on respective opposite sides in an axial direction, such that each of the flanks is inclined by a predetermined flank angle corresponding to a shape of a valley of an internal thread to be formed. A sharp crest is provided in a top portion of the thread ridge at least in the leading portion, and has, in the axial cross section, a triangular shape that is defined by a pair of side surfaces located on respective opposite sides in the axial direction, such that each of the side surfaces is inclined by an inclination angle that is larger than the flank angle.

8 Claims, 7 Drawing Sheets

(56) References Cited

U.S. PATENT DOCUMENTS

| | | | |
|---|---|---|---|
| 3,125,772 A * | 3/1964 | Beck | B23G 5/06 |
| | | | 408/218 |
| 7,467,577 B2 | 12/2008 | Glimpel et al. | |
| 11,045,889 B2 * | 6/2021 | Yokokawa | B23G 1/34 |
| 2006/0121995 A1 | 6/2006 | Glimpel et al. | |
| 2011/0020087 A1 | 1/2011 | Yamamoto et al. | |

FOREIGN PATENT DOCUMENTS

| | | | |
|---|---|---|---|
| JP | 2006-159405 A | 6/2006 | |
| JP | 3822572 B2 | 9/2006 | |
| JP | 2007-313575 A | 12/2007 | |
| JP | 3146222 U | 11/2008 | |
| WO | 2016/030100 A1 | 3/2016 | |
| WO | WO-2016030100 A1 * | 3/2016 | B23G 7/02 |

OTHER PUBLICATIONS

Jan. 4, 2022 Extended European Search Report issued in Patent Application No. 18920669.1.

Oct. 26, 2021 Office Action issued in Japanese Patent Application No. 2020-522505.

Aug. 28, 2018 Search Report issued in International Patent Application No. PCT/JP2018/020958.

Jun. 4, 2020 Office Action issued in Taiwanese Patent Application No. 108118106.

Aug. 28, 2018 Written Opinion of the International Searching Authority issued in International Patent Application No. PCT/JP2018/020958.

Jun. 16, 2020 International Preliminary Report on Patentability issued in International Patent Application No. PCT/ JP2018/020958.

Jul. 29, 2021 Office Action issued in Indian Patent Application No. 202037053241.

Oct. 14, 2022 Office Action issued in Chinese Patent Application No. 201880093303.9.

Mar. 11, 2023 Office Action issued in Chinese Application No. 201880093303.9.

Jun. 29, 2023 Office Action issued in Chinese Application No. 201880093303.9.

Nov. 14, 2023 Decision of Refusal issued in Chinese Patent Application No. 201880093303.9.

* cited by examiner

FIG.6

| TAP NOMINAL SIZE | M10 × 1.5 |
|---|---|
| WORKPIECE MATERIAL | S45C |
| PREPARED HOLE DIAMETER | φ9.26 |
| THREADING LENGTH | 20mm |
| CUTTING SPEED | 10m/min |
| CUTTING FLUID | WATER-SOLUBLE CUTTING FLUID |
| MACHINE | VERTICAL MACHINING CENTER |

FIG.7

| | FLAT CREST (PRIOR ART) | INCLINATION ANGLES OF SIDE SURFACES OF SHARP CREST ($\beta 1 = \beta 2$) | | | | |
|---|---|---|---|---|---|---|
| | | 85° | 75° | 60° | 45° | 35° |
| TORQUE(N·cm) | 3064 | 3044 | 2901 | 2865 | 2746 | BREAKAGE |
| THRUST LOAD(N) | 306 | 273 | 264 | 249 | 242 | |
| TORQUE RATIO(%) | 100 (STANDARD) | 99.3 | 94.7 | 93.5 | 89.6 | |
| THRUST LOAD RATIO(%) | 100 (STANDARD) | 89.2 | 86.3 | 81.4 | 79.1 | |

FIG.8

| TAP NOMINAL SIZE | M10×1.5 |
|---|---|
| WORKPIECE MATERIAL | SCM440(30HRC) |
| PREPARED HOLE DIAMETER | φ9.26 |
| THREADING LENGTH | 20mm |
| CUTTING SPEED | 5m/min |
| CUTTING FLUID | WATER-SOLUBLE CUTTING FLUID |
| MACHINE | VERTICAL MACHINING CENTER |

FIG.9

| | FLAT CREST (PRIOR ART) | INCLINATION ANGLES OF SIDE SURFACES OF SHARP CREST ($\beta 1=\beta 2$) | | | | |
|---|---|---|---|---|---|---|
| | | 85° | 75° | 60° | 45° | 35° |
| TORQUE(N·cm) | 3651 | 3442 | 3269 | 3204 | 3151 | BREAKAGE |
| THRUST LOAD(N) | 318 | 316 | 266 | 254 | 239 | |
| TORQUE RATIO(%) | 100 (STANDARD) | 94.3 | 89.5 | 87.8 | 86.3 | |
| THRUST LOAD RATIO(%) | 100 (STANDARD) | 99.4 | 83.6 | 79.9 | 75.2 | |

FIG.10

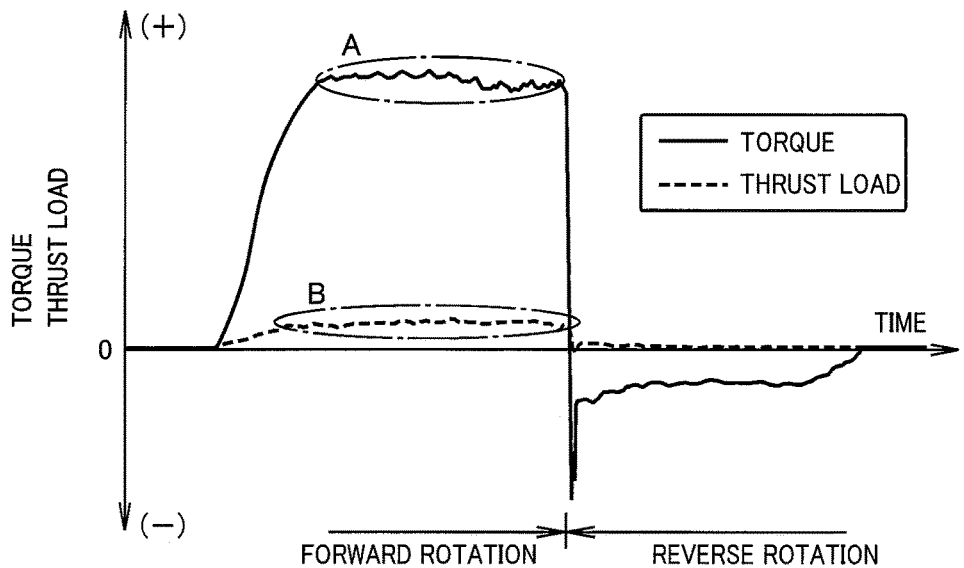

THREAD FORMING TAP

TECHNICAL FIELD

The present invention relates to a thread forming tap, and, more particularly, to a technique for reducing a torque in a tapping operation in which an internal thread is machined by the thread forming tap.

BACKGROUND ART

There is known a thread forming tap including (i) a complete thread portion and (ii) a leading portion which is provided to be contiguous with the complete thread portion and which has a diameter reduced in a direction toward a distal end, such that the complete thread portion and the leading portion are provided with an external thread in which protruding portions and relieved portions are alternately formed, wherein the leading portion is introduced into a prepared hole formed in a workpiece and then the thread forming tap is screwed into the prepared hole, whereby the protruding portions of the external thread are caused to bite into an inner-wall-surface layer portion of the prepared hole, so as to cause the inner-wall-surface layer portion to be plastically deformed for thereby forming an internal thread (see Patent Documents 1 and 2).

PRIOR ART DOCUMENT

Patent Documents

Patent Document 1:
Japanese Unexamined Patent Application Publication No. 2007-313575
Patent Document 2:
Japanese Patent No. 3822572

DISCLOSURE OF THE INVENTION

Object to be Achieved by the Invention

By the way, when a tapping operation is performed for machining of an internal thread by the thread forming tap described above, a thread ridge of the external thread is caused to bite into an inner-wall-surface layer portion of a prepared hole provided in a workpiece, so as to cause the inner-wall-surface layer portion to be plastically deformed. Thus, during the tapping operation, a large torque (rotational resistance) is generated, so that there is a case in which a sufficient tool life cannot be obtained due to wear or the like, depending on a machining condition.

The present invention was made in view of the background discussed above. It is therefore an object of the present invention to restrain reduction of the tool life due to wear or the like, by reducing a torque in the tapping operation.

Measures for Solving the Problem

For achieving the above object, a first aspect of the present invention is, in a thread forming tap comprising a complete thread portion and a leading portion which is provided to be contiguous with the complete thread portion and which has a diameter reduced in a direction toward a distal end of the thread forming tap, such that the complete thread portion and the leading portion are provided with an external thread in which protruding portions and relieved portions are alternately formed, characterized in that: (a) a thread ridge of the external thread has, in an axial cross section that is parallel to an axis of the thread forming tap, a triangular shape that is defined by a pair of flanks located on respective opposite sides in a direction of the axis, such that each of the flanks is inclined by a predetermined flank angle; and (b) a sharp crest is provided in a top portion of the thread ridge at least in the leading portion, and has, in the axial cross section, a triangular shape that is defined by a pair of side surfaces located on respective opposite sides in the direction of the axis, such that each of the side surfaces is inclined by an inclination angle that is larger than the flank angle.

A second aspect of the present invention is, in the thread forming tap according to the first aspect, characterized in that: the inclination angle of each of the side surfaces of the sharp crest is within a range from 40° to 80°.

A third aspect of the present invention is, in the thread forming tap according to the first or second aspect, characterized in that: the side surfaces of the sharp crest intersect with each other in a top end portion of the sharp crest, and an internal angle of the top end portion is within a range from 80° to 160°.

A fourth aspect of the present invention is, in the thread forming tap according to any one of the first through third aspects, characterized in that: the inclination angle of one of the side surfaces of the sharp crest and the inclination angle of the other of the side surfaces of the sharp crest are equal to each other.

A fifth aspect of the present invention is, in the thread forming tap according to any one of the first through fourth aspects, characterized in that: the side surfaces of the sharp crest are connected directly to the flanks, respectively.

A sixth aspect of the present invention is, in the thread forming tap according to any one of the first through fifth aspects, characterized in that: the side surfaces of the sharp crest intersect with each other in the top end portion of the sharp crest, and the top end portion is rounded in the axial cross section.

A seventh aspect of the present invention is, in the thread forming tap according to any one of the first through sixth aspects, characterized in that: the sharp crest is provided in the thread ridge exclusively in the leading portion, and a crest of the thread ridge in the complete thread portion has a shape corresponding to a desired shape of a root of an internal thread.

Effect of the Invention

In the thread forming tap as described above, the sharp crest having the triangular cross-sectional shape is provided in the top portion of the thread ridge at least in the leading portion, so that the thread ridge is easily caused to bite into an inner-wall-surface layer portion of a prepared hole of a workpiece when an internal thread is to be machined in a tapping operation by the thread forming tap, whereby a torque during the tapping operation is reduced. Further, since each of the side surfaces of the sharp crest is inclined by the inclination angle that is larger than the flank angle of the thread ridge, the angle (internal angle) of the top end portion in which the side surfaces of the sharp crest intersect with each other is larger than an angle defined between extensions of the respective flanks, thereby restraining breakage or the like due to lack of strength of the top portion. That is, it is possible to restrain reduction of the tool life due to wear or the like, by reducing the torque during the tapping operation while assuring the strength of the top portion of the thread ridge. Further, owing to the reduction of the torque during the tapping operation, it is possible to reduce also a thrust load upon lead feed of the thread forming tap in the direction of the axis in synchronization with rotation of the thread forming tap.

In the second aspect of the invention, the inclination angles of the respective side surfaces of the sharp crest are both within the range from 40° to 80°, so that it is possible to appropriately obtain an effect that the torque during the tapping operation is reduced while the strength of the top portion of the thread ridge is obtained. That is, although it varies depending on the machining condition (such as a material of the internal thread), in general, where the inclination angles of the respective side surfaces are smaller than 40°, the strength of the top end portion of the sharp crest is insufficient whereby breakage or the like is likely to be caused. Further, in general, where the inclination angles of the respective side surfaces are larger than 80°, the top portion of the thread ridge becomes almost flat (straight line) in the axial cross section in spite of presence of the sharp crest whereby the effect of reduction of the torque during the tapping operation is unlikely to be sufficiently obtained.

In the third aspect of the invention, the internal angle of the top end portion in which the side surfaces of the sharp crest intersect with each other is within the range from 80° to 160°, so that it is possible to appropriately obtain the effect that the torque during the tapping operation is reduced while the strength of the top portion of the thread ridge is obtained. That is, although it varies depending on the machining condition (such as a material of the internal thread), in general, where the internal angle of the top end portion of the sharp crest is smaller than 80°, the strength of the top end portion of the sharp crest is insufficient whereby breakage or the like is likely to be caused. Further, in general, where the internal angle of the top end portion is larger than 160°, the sharp crest itself becomes almost flat (straight line) in the axial cross section whereby the effect of reduction of the torque during the tapping operation is unlikely to be sufficiently obtained. In the third aspect of the invention, both of the inclination angles of the respective side surfaces of the sharp crest do not have to be within the range from 40° to 80°, and the inclination angle of one of the side surfaces may be smaller than 40° or larger than 80° as long as the internal angle of the top end portion is made within the range from 80° to 160° by appropriately determining the inclination angle of the other of the side surfaces.

In the fourth aspect of the invention, the inclination angle of one of the side surfaces of the sharp crest and the inclination angle of the other of the side surfaces of the sharp crest are equal to each other. When the internal thread is formed with the thread ridge being caused to bite into the inner-wall-surface layer portion of the prepared hole of the workpiece, displaced material (metal) of the inner-wall-surface layer portion is caused to flow toward opposite sides of the sharp crest substantially evenly whereby the torque during the tapping operation is appropriately reduced. Further, in connection with the flow of the displaced material (metal) of the inner-wall-surface layer portion substantially evenly toward the opposite sides of the sharp crest in the direction of the axis and the reduction of the torque during the tapping operation, it is possible to reduce the thrust load upon the lead feed of the thread forming tap in the direction of the axis in synchronization with rotation of the thread forming tap.

In the fifth aspect of the invention, the side surfaces of the sharp crest are connected directly to the flanks, respectively, in other words, the sharp crest is provided to be contiguous to the flanks. In this arrangement, for example, as compared with an arrangement in which an inclined surface or the like having an intermediate inclination angle is provided between the sharp crest and each of the flanks, the internal angle of the top end portion of the sharp crest can be made smaller whereby the torque during the tapping operation can be appropriately reduced.

In the sixth aspect of the invention, the top end portion in which the side surfaces of the sharp crest intersect with each other is rounded so that the strength of the top end portion is increased whereby the breakage or the like is restrained. Where the top end portion of the sharp crest is rounded by a large amount, when the top end portion is caused to bite into the inner-wall-surface layer portion of the prepared hole of the workpiece, a resistance is increased whereby tapping torque is increased thereby causing a risk that the tool life could be reduced. Therefore, a size and presence/absence of round is determined by taking account of, for example, the internal angle of the top end portion of the sharp crest such that a certain degree of tool life can be obtained.

In the seventh aspect of the invention, the sharp crest is provided in the thread ridge exclusively in the leading portion, and the crest of the thread ridge in the complete thread portion has a shape corresponding to a desired shape of the root of the internal thread, so that the root of the internal thread can be appropriately formed to the desired shape by the complete thread portion while the torque during the tapping operation is reduced owing to the sharp crest of the leading portion.

BRIEF DESCRIPTION OF DRAWINGS

FIG. 6 is a view for explaining a machining condition when internal threads were machined by using a plurality of test samples including the thread forming tap of FIG. 1.

FIG. 7 is a view for explaining results of measurements of torque and thrust load when the internal threads were machined in the machining condition of FIG. 6.

FIG. 8 is a view for explaining a machining condition when internal threads were machined in a workpiece whose material was different from a material of workpiece in the machining condition of FIG. 6, by using a plurality of test samples including the thread forming tap of FIG. 1.

FIG. 9 is a view for explaining results of measurements of torque and thrust load when the internal threads were machined in the machining condition of FIG. 8.

FIG. 10 is a view showing, by way of examples, characteristics of changes of the torque and the thrust load when the internal threads were machined in the machining conditions of FIGS. 6 and 8.

MODES FOR CARRYING OUT THE INVENTION

Figure 1:
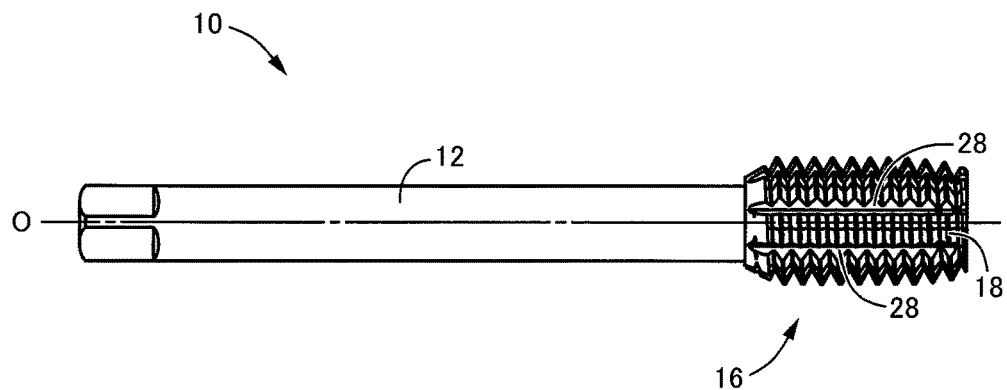
FIG. 1 is a view for explaining a thread forming tap as an embodiment of the present invention, and is a front view as seen in a direction perpendicular to an axis O of the tap.

The thread forming tap of the present invention is to be used to be screwed into a prepared hole formed in a workpiece, with the leading portion being first introduced into the prepared hole, whereby the protruding portions of the external thread are caused to bite into an inner-wall-surface layer portion of the prepared hole, so as to cause the inner-wall-surface layer portion to be plastically deformed for thereby forming an internal thread. The present invention may be embodied in various forms. For example, a drill or reamer may be provided integrally in a distal end portion of the thread forming tap, such that the prepared hole is machined by the drill or reamer. Further, an inside-diameter finishing blade or blades may be provided integrally in the thread forming tap, such that an inside diameter of the formed internal thread is finished by the inside-diameter finishing blade or blades. Moreover, the present invention is applicable not only to a thread forming tap for machining a single thread but also to a thread forming tap for machining a multiple thread such as a double or more thread.

It is preferable that the plurality of protruding portions are provided to be arranged in three or more lines equiangularly about the axis of the thread forming tap such that the protruding portions of each line are contiguous to each other in parallel to the axis. However, the protruding portions may be provided such that the protruding portions of each line are contiguous to each other along a helix twisted about the axis, or such that the protruding portions are arranged non-equiangularly about the axis. That is, the protruding portions may be arranged in any one of various manners. Further, an oil groove or grooves or the like may be provided to extend in a direction of the axis to divide the external thread, as needed, such that a cutting fluid is supplied through the oil groove or grooves. Since the thread forming tap does not produce cutting chips, it is possible to satisfactorily perform a tapping operation to form an internal thread either in a blind hole or a through-hole.

It is common that both of the flanks of the thread ridge of the external thread are inclined by 30° as the flank angle so that angles (all angles) of the thread ridge are 60°. However, the present invention is applicable also to a thread forming tap having a thread ridge whose flank angle is other than 30° or a thread ridge defined by flanks that are inclined by respective flank angles different from each other. Both of the inclination angles of the respective side surfaces are preferably not smaller than 40° and more preferably not smaller than 45°, and are preferably not larger than 80° and more preferably not larger than 75°, with satisfaction of a condition that the inclination angles of the respective side surfaces of the sharp crest are larger than the flank angles. However, the inclination angles of the respective side surfaces may be smaller than 40° or larger than 80°, and may be determined suitably depending on, for example, the machining condition (such as a material of the internal thread). The internal angle of the top end portion of the sharp crest is preferably not smaller than 80° and more preferably not smaller than 90°, and is preferably not larger than 160° and more preferably not larger than 150°. However, the internal angle of the top end portion may be smaller than 80° or larger than 160°, and may be determined suitably depending on, for example, the machining condition (such as a material of the internal thread). The inclination angles of the respective side surfaces of the sharp crest are set to respective angle values equal to each other, for example, but may be set to respective angle values different from each other. Further, the sharp crest is provided, for example, such that the top end portion of the sharp crest lies on a center line of the thread ridge in the axial cross section. However, the sharp crest may be provided such that the top end portion of the sharp crest is offset from the center line of the thread ridge.

The sharp crest is provided, for example, such that the side surfaces are connected directly to the respective flanks in the axial cross section. However, an inclined surface or the like, which is inclined by an intermediate inclination angle, may be provided between each of the side surfaces of the sharp crest and a corresponding one of the flanks. It is preferable that the top end portion of the sharp crest is formed to be sharp as much as possible, for reducing the torque during the tapping operation. However, the top end portion of the sharp crest may be rounded by a certain amount in the axial cross section, for assuring a certain degree of strength. Further, regarding a connecting portion connecting each of the side surfaces of the sharp crest and a corresponding one of the flanks, too, the connecting portion may be formed to be either sharp or rounded by a certain degree.

For example, the sharp crest is provided in the thread ridge only in the leading portion, while the crest of the thread ridge in the complete thread portion has a shape corresponding to a desired shape of a root of an internal thread, for example, a linear or arc shape in the axial cross section. However, the sharp crest may be provided in the thread ridge also in the complete thread portion as well as in the leading portion. In this case, since a V-shaped groove corresponding to a shape of the sharp crest is formed in the root of the machined internal thread, the root may be formed to a desired shape by a cutting or grinding operation, for example, as needed, after the tapping operation.

EMBODIMENTS

Hereinafter, preferred embodiments of the invention will be described in detail with reference to the accompanying drawings. It is noted that, in the embodiments described below, the figures of the drawings are simplified or deformed, as needed, for convenience of description, and each portion is not necessarily precisely depicted in terms of dimension ratio, shape, etc.

Figure 2:
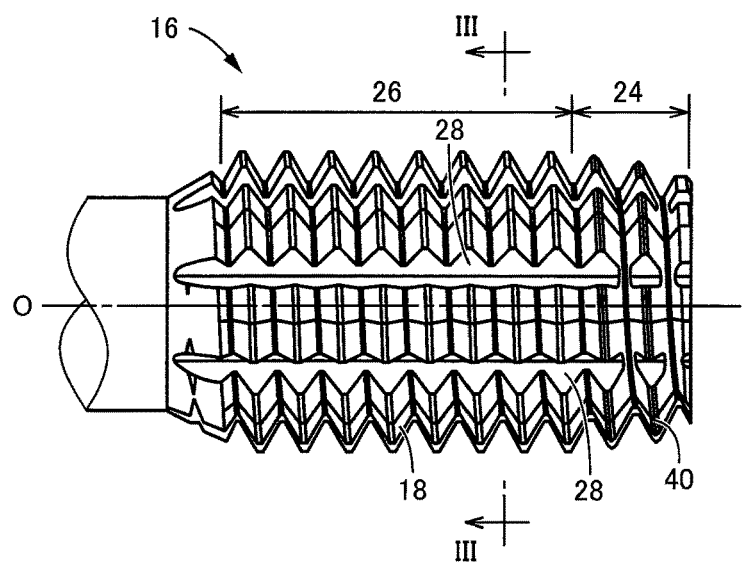
FIG. 2 is a front view showing, in enlargement, a thread portion of the thread forming tap of FIG. 1.
Figure 3:
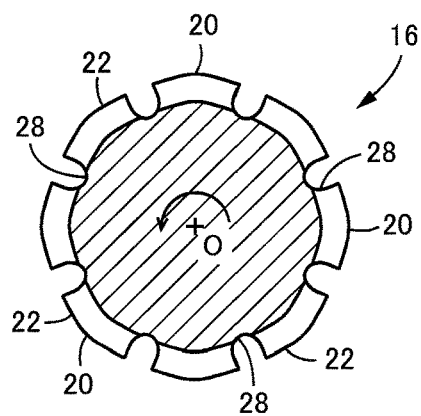
FIG. 3 is a view of a cross section perpendicular to an axis and taken along a helix of a thread ridge, viewed in a direction of arrows III-III in FIG. 2.

FIG. 1 is a view for explaining a thread forming tap 10 as an embodiment of the present invention, and is a front view as seen in a direction perpendicular to an axis O of the tap 10. The thread forming tap 10 includes a shank portion 12 and a thread portion 16 which are integral with each other and which are coaxial with the axis O. The shank portion 12 is to be attached to a spindle head through a chuck (not shown). The thread portion 16 is provided to form (roll) an internal thread by plastic deformation. FIG. 2 is a front view showing, in enlargement, the thread portion 16. FIG. 3 is a view of a cross section perpendicular to the axis O and taken along a thread ridge 18 of the thread portion 16, as seen in a direction of arrows III-III in FIG. 2. The thread portion 16 has a polygonal shape defined by sides each of which is outwardly curved. In the present embodiment, the thread portion 16 has a substantially regular octagonal shape in its cross section, and has an outer circumferential surface provided with an external thread that is to be caused to bite into a surface layer portion of a prepared hole of a workpiece (internal thread material) and to cause the surface layer portion to be plastically deformed for thereby forming the internal thread. The thread forming tap 10 according to the present embodiment is to be used to machine a single thread, and accordingly the external thread of the thread forming tap 10 is also a single thread.

The thread ridge 18 of the external thread has a cross sectional shape corresponding to a shape of a valley of the internal thread that is to be formed, and extends along a helix having a lead angle of the internal thread. The thread portion 16 includes eight protruding portions 20 and eight relieved portions 22 that are alternately arranged in a helical direction in which the thread ridge 18 extends. The protruding portions 20, in each of which the thread ridge 18 protrudes radially outwardly, are arranged equiangularly about the axis O at an angular pitch of 45°. The relieved portions 22, each of which has a small diameter and is contiguous to a corresponding one of the protruding portions 20 in the helical direction, are arranged equiangularly about the axis O at an angular pitch of 45°. That is, the multiplicity of protruding portions 20 are arranged in eight lines that correspond to respective vertexes of the regular octagonal shape, such that the protruding portions 20 of each of the eight lines are successively arranged in parallel to the axis O, and such that the eight lines of the protruding portions 20 are arranged equiangularly about the axis O.

Figure 4:
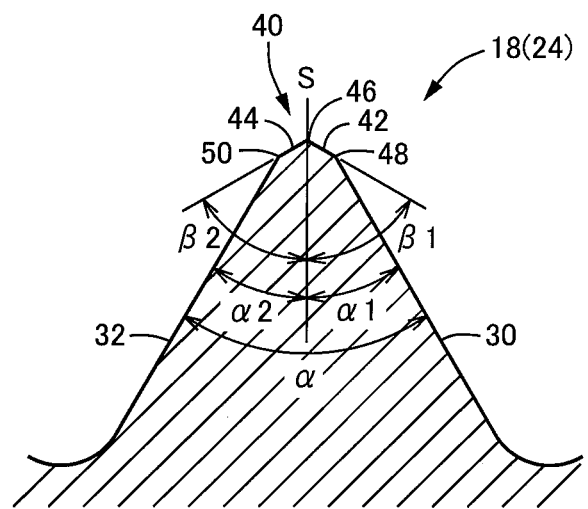
FIG. 4 is a view of a cross section parallel to the axis and showing the thread ridge of an external thread in a leading portion of the thread forming tap of FIG. 1.
Figure 5:
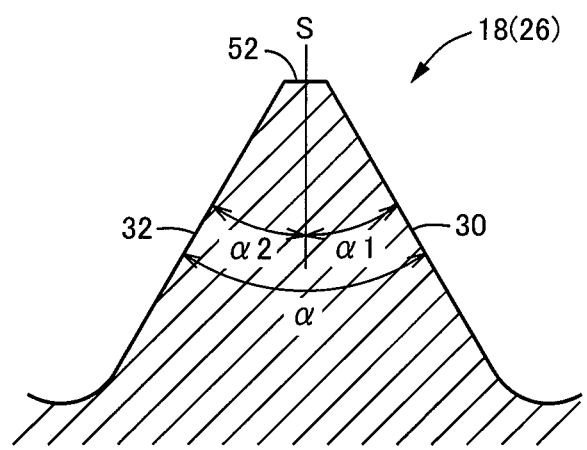
FIG. 5 is a view of a cross section parallel to the axis and showing the thread ridge of the external thread in a complete thread portion of the thread forming tap of FIG. 1.

The thread portion 16 includes a complete thread portion 26 having a diameter that is substantially constant in the direction of the axis O, and a leading portion 24 having a diameter that is reduced in a direction toward a distal end of the thread portion 16. In the leading portion 24, an outside diameter, a pitch diameter and a root dimeter of the external thread are changed at respective constant rates that are equal to one another. In the leading portion 24, too, the thread portion 16 has a substantially regular octagonal shape in its cross section, as shown in FIG. 3, and includes the protruding portions 20 and the relieved portions 22 that are alternately arranged in a circumferential direction about the axis O. FIG. 4 is a view of a cross section parallel to the axis O and showing the thread ridge 18 in the leading portion 24. FIG. 5 is a view of a cross section parallel to the axis O and showing the thread ridge 18 in the complete thread portion 26. The thread ridge 18 has, in the cross section that is parallel to the axis O, a triangular shape that is defined by a pair of leading and trailing flanks 30, 32 located on respective opposite sides of the thread ridge 18 in the direction of the axis O, such that the leading and trailing flanks 30, 32 are inclined by predetermined flank angles α1, α2, respectively. In the present embodiment, the flank angles α1, α2 are equal to each other and both are 30° (α1=α2=30°), and the thread ridge 18 has a regular triangular shape with all angles α being 60° and with the flanks 30, 32 being symmetrical with each other with respect to a center line S that tis perpendicular to the axis O. Further, in the outer circumferential surface of the thread portion 16, there are provided oil grooves 28 through which a lubricant fluid is to be supplied, such that each of the oil grooves 28 is located in an intermediate position between each adjacent two of the eight lines of the protruding portions 20 in the circumferential direction about the axis O.

The thread forming tap 10 constructed as described above is to be screwed into the prepared hole formed in the workpiece with the leading portion 24 being first introduced into the prepared hole, whereby the protruding portions 20 are caused to bite into an inner-wall-surface layer portion of the prepared hole, so as to cause the inner-wall-surface layer portion to be plastically deformed for thereby machining the internal thread. In such a tapping operation by the thread forming tap 10, a large torque (rotational resistance) is generated so that there is a case in which the tap 10 cannot have a sufficient tool life due to wear or the like depending on a machining condition.

In the present embodiment, a sharp crest 40 is provided in a top portion of the thread ridge 18 in the leading portion 24. The sharp crest 40 has, in the cross section shown in FIG. 4, a triangular shape that is defined by a pair of side surfaces 42, 44 located on the respective opposite sides of the thread ridge 18 in the direction of the axis O, such that the side surfaces 42, 44 are inclined by respective inclination angles β1, β2 that are larger than the flank angles α1, α2. That is, the side surfaces 42, 44 are represented by respective lines in the cross section shown in FIG. 4, and interest with each other in a top end portion 46 of the thread ridge 18. In the present embodiment, the inclination angles β1, β2 are equal to each other (β1=β2), and the side surfaces 42, 44 are symmetrical with each other with respect to the center line S of the thread ridge 18. Each of the inclination angles β1, β2 is set to a suitable angle value within a range from 40° to 80°, preferably, within a range from 45° to 75°, so that an internal angle (=β1+β2) of the top end portion 46 in which the side surfaces 42, 44 intersect with each other is within a range from 80° to 160°, preferably, within a range from 90° to 150°. Further, the sharp crest 40 is provided to be contiguous to the flanks 30, 32, such that each of the side surfaces 42, 44 of the sharp crest 40 is connected directly to a corresponding one of the flanks 30, 32 in a bent manner in the cross section shown in FIG. 4. In the present embodiment, the top end portion 46 of the sharp crest 40 is formed to be sharp as much as possible, and connection portions 48, 50 through the side surfaces 42, 44 of the sharp crest 40 and the flanks 30, 32 are connected are also sharp.

On the other hand, in the complete thread portion 26, the thread ridge 18 has a cross sectional shape as shown in FIG. 5, wherein the cross sectional shape corresponds to a desired cross sectional shape of a thread groove of an internal thread. In the present embodiment, a crest 52 is provided and is represented by a straight line parallel to the axis O in the cross section shown in FIG. 5. That is, in the complete thread portion 26, the crest 52 of the thread ridge 18 forms a cylindrical shape whose axis coincides with the axis O.

The sharp crest 40, which is provided in the thread ridge 18 in the leading portion 24, can be formed, for example, by forming a thread ridge having the same cross sectional shape as the thread ridge 18 in the complete thread portion 26 shown in FIG. 5, and then chamfering opposite-side corner portions of a crest (that has the same cross sectional shape as the crest 52 shown in FIG. 5) by a grinding or cutting operation. It is noted that the thread ridge 18 having the cross sectional shape shown in FIG. 4 may be formed by any one of various kinds of production methods such a rolling operation.

There will be next described results of measurements of a torque and a thrust load when tapping operations were performed on two kinds of workpieces of different materials by preparing a plurality of test samples including the thread forming tap 10 of the present embodiment. FIGS. 6 and 7 show condition and result of the test in which the tapping operations were performed on workpieces made of S45C (carbon steel for machine structure) that is defined by JIS. FIGS. 8 and 9 show condition and result of the test in which the tapping operations were performed on workpieces made of SCM440 (30HRC) (chromium molybdenum steel) that is defined by JIS. In FIGS. 7 and 9, "FLAT CREST (PRIOR ART)", which is one of the test samples, is a conventional thread forming tap in which the thread ridge 18 has a flat crest as the crest 52 shown in FIG. 5, not only in the complete thread portion 26 but also in the leading portion 24. The other test samples include the sharp crest 40 as the thread forming tap 10, such that the inclination angles β1, β2 are equal to each other (β1=β2) and vary within a range from 35° to 85°. Three of the test sample having the inclination angles β1, β2 of 45°, 60° and 75° are examples of the present invention.

Further, in FIGS. 7 and 9, "TORQUE (N·cm)" and "THRUST LOAD (N)" indicate values obtained through measurements made by a measurement device of model 5697A manufactured by KISTLER, which was attached to a spindle of a machine used in the test. The indicated values were calculated from data shown in FIG. 10. Specifically, each value indicated in "TORQUE (N·cm)" is an average value in part A (shown in FIG. 10) in which the value is substantially stabilized, and each value indicated in "THRUST LOAD (N)" is an average value in part B (shown in FIG. 10) in which the value is substantially stabilized. A maximum value during a forward rotation of the tap 10 or an average value of a plurality of peak values also may be used. In FIGS. 7 and 9, "TORQUE RATIO (%)" and "THRUST LOAD RATIO (%)" indicate ratios (percentages) of measured torques and thrust loads of the test samples (except the conventional thread forming tap) with respect to standard values (100%) that are measured torque and thrust loads of the conventional thread forming tap ("FLAT CREST (PRIOR ART)"). The smaller the ratios, the larger the effect of reducing the torque and the thrust load. In FIG. 10, "FORWARD ROTATION" is rotation in a rotation direction in which the thread forming tap is screwed into the prepared hole of the workpiece for performing the tapping operation, while "REVERSE ROTATION" is rotation in a rotation direction in which the thread forming tap is to be rotated to be pulled out of the formed internal thread. In FIG. 10, "TORQUE" of positive (+) value is a torque that acts in a forward rotation direction that causes the thread forming tap to be rotated in a forward direction, against a rotational resistance generated when the thread forming tap is screwed into the prepared hole, and "TORQUE" of negative (−) value is a torque that acts in a reverse rotation direction that causes the thread forming tap to be rotated in a reverse direction, against the rotational resistance generated due to an elastic restoration of the workpiece when the thread forming tap is rotated in the reverse direction so as to be pulled out of the formed internal thread. In FIG. 10, "THRUST LOAD" of positive (+) value is a load by which the thread forming tap is forced in an axially forward direction for a lead feed (synchronized feed) when the thread forming tap is rotated in the forward direction so as to be screwed into the prepared hole. It is noted that the thrust load is substantially zero when the thread forming tap 10 is rotated in the reverse direction so as to be pulled out of the formed internal thread.

As shown in FIGS. 7 and 9 indicating the test results, among the test samples in each of which the sharp crest 40 is provided in the top portion of the thread ridge 18 in the leading portion 24, the test sample in which the inclination angles β1, β2 are 35° suffered from breakage in the top portion of the thread ridge 18 and failed in machining the internal thread in both of the two kinds of workpieces. However, the test samples in each of which the inclination angles β1, β2 range from 45° to 85° were able to perform the tapping operations without suffering from any breakage in either of the two kinds of workpieces, with the torque and the thrust load being both lower as compared with the conventional test sample in which the crest is flat. Particularly, the test samples in each of which the inclination angles β1, β2 range from 45° to 75° and which correspond to the thread forming tap 10 of the present embodiment exhibited large effect of reducing the torque and the thrust load.

As described above, in the thread forming tap 10 according to the present embodiment, the sharp crest 40 having the triangular cross-sectional shape is provided in the top portion of the thread ridge 18 in the leading portion 24, so that the thread ridge 18 is easily caused to bite into the inner-wall-surface layer portion of the prepared hole of the workpiece when the internal thread is to be machined in a tapping operation by the thread forming tap 10, whereby a torque and a thrust load during the tapping operation are reduced. Further, since the side surfaces 42, 44 of the sharp crest 40 are inclined by the inclination angles β1, β2 that are larger than the flank angles α1, α2 of the thread ridge 18, the angle (internal angle) of the top end portion 46 in which the side surfaces 42, 44 of the sharp crest 40 intersect with each other is larger than an angle defined between extensions of the respective flanks 30, 32, thereby restraining breakage or the like due to lack of strength of the top portion. That is, it is possible to restrain reduction of the tool life due to wear or the like, by reducing the torque and the thrust load during the tapping operation while assuring the strength of the top portion of the thread ridge 18.

Further, the inclination angles β1, β2 of the respective side surfaces 42, 44 of the sharp crest 40 are both within the range from 40° to 80°, so that it is possible to appropriately obtain the effect that the torque during the tapping operation is reduced while the strength of the top portion of the thread ridge 18 is obtained. That is, if the inclination angles β1, β2 of the respective side surfaces 42, 44 are smaller than 40°, the strength of the top end portion 46 of the sharp crest 40 is insufficient whereby breakage or the like is likely to be caused, as in the test sample in which the inclination angles β1, β2 are 35°. On the other hand, if the inclination angles β1, β2 of the respective side surfaces 42, 44 are larger than 80°, the top portion of the thread ridge 18 becomes almost flat (straight line) in the cross section parallel to the axis O in spite of presence of the sharp crest 40 whereby the effect of reductions of the torque and the thrust load during the tapping operation cannot be sufficiently obtained, as in the test sample in which the inclination angles β1, β2 are 85°.

Further, in the thread forming tap 10 according to the present embodiment, the inclination angles β1, β2 are equal to each other (β1=β2) and the internal angle of the top end portion 46 of the sharp crest 40 is within the range from 80° to 160°, so that it is possible to appropriately obtain the effect that the torque and the thrust load during the tapping operation are reduced while the strength of the top portion of the thread ridge 18 is obtained. That is, if the internal angle of the top end portion 46 of the sharp crest 40 is smaller than 80°, the strength of the top end portion 46 of the sharp crest 40 is insufficient whereby breakage or the like is likely to be caused, as in the test sample in which the inclination angles β1, β2 are 35° (with the internal angle of the top end portion 46 being 70°). On the other hand, if the internal angle of the top end portion 46 is larger than 160°, the sharp crest 40 itself becomes almost flat (straight line) in the cross section parallel to the axis O whereby the effect of reductions of the torque and the thrust load during the tapping operation cannot be sufficiently obtained, as in the test sample in which the inclination angles β1, β2 are 85° (with the internal angle of the top end portion 46 being 170°).

Further, in the thread forming tap 10 according to the present embodiment, the inclination angles β1, β2 of the respective side surfaces 42, 44 of the sharp crest 40 are equal to each other. Therefore, when the internal thread is formed with the thread ridge 18 being caused to bite into the inner-wall-surface layer portion of the prepared hole of the workpiece, displaced material (metal) of the inner-wall-surface layer portion is caused to flow toward opposite sides of the sharp crest 40 substantially evenly whereby the torque and the thrust load during the tapping operation are appropriately reduced.

Further, in the thread forming tap 10 according to the present embodiment, the side surfaces 42, 44 of the sharp crest 40 are connected directly to the flanks 30, 32, respectively, in a bent manner, so that the sharp crest 40 is provided to be contiguous to the flanks 30, 32. In this arrangement, for example, as compared with an arrangement in which an inclined surface or the like having an intermediate inclination angle is provided between the sharp crest 40 and each of the flanks 30, 32, the internal angle of the top end portion 46 of the sharp crest 40 can be made smaller whereby the torque and the thrust load during the tapping operation can be appropriately reduced.

Further, in the thread forming tap 10 according to the present embodiment, the sharp crest 40 is provided in the thread ridge 18 exclusively in the leading portion 24, and the crest 52 of the thread ridge 18 in the complete thread portion 26 has a flat shape in the cross section parallel to the axis O, which corresponds to a desired shape of the root of the internal thread, so that the root of the internal thread can be appropriately formed to the desired shape by the complete thread portion 26 while the torque and the thrust load during the tapping operation are reduced owing to the sharp crest 40 of the leading portion 24.

There will be described other embodiments of this invention. The same reference signs as used in the above-described embodiment will be used in the following embodiments, to identify the practically corresponding elements, and descriptions thereof are not provided.

Figure 11:
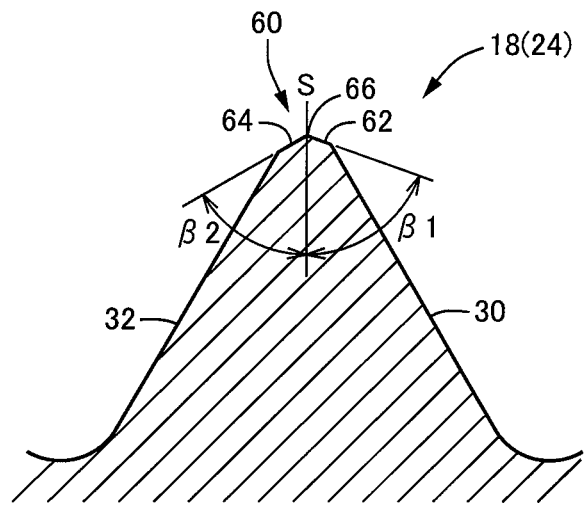
FIG. 11 is a view for explaining another embodiment of the present invention, and is a cross sectional view corresponding to FIG. 4 and showing the thread ridge of the external thread in the leading portion of the thread forming tap.

FIG. 11 is a view corresponding to FIG. 4, namely, a view of a cross section parallel to the axis O, which shows the thread ridge 18 of the external thread in the leading portion 24. This embodiment is different from the above-described embodiment with respect to a sharp crest 60 provided in the top portion of the thread ridge 18. That is, in the sharp crest 60, the inclination angle β1 of a side surface 62 contiguous to the leading flank 30 and the inclination angle β2 of another side surface 64 contiguous to the trailing flank 32 are different from each other, so that the sharp crest 60 is asymmetrical in shape with respect to the center line S although a top end portion 66 of the thread ridge 18 lies on the center line S. Specifically, the inclination angle β1 of the side surface 62 contiguous to the leading flank 30 is larger than the inclination angle β2 of the side surface 64 contiguous to the trailing flank 32. In this arrangement, when the internal thread is machined with the thread ridge 18 being caused to bite into the inner-wall-surface layer portion of the prepared hole of the workpiece, a rate of flow of displaced material (metal) of the inner-wall-surface layer portion on a side of the side surface 62 and that on a side of the side surface 64 are made different from each other so that it is possible to adjust the thrust load during the tapping operation. It is noted that the inclination angle β1 of the side surface 62 may be made smaller than the inclination angle β2 of the side surfaces 64.

Figure 12:
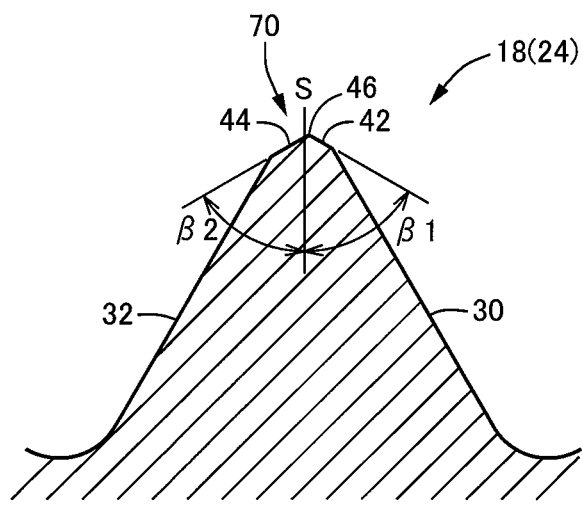
FIG. 12 is a view for explaining still another embodiment of the present invention, and is a cross sectional view corresponding to FIG. 4 and showing the thread ridge of the external thread in the leading portion of the thread forming tap.

FIG. 12 is a view corresponding to FIG. 4, namely, a view of a cross section parallel to the axis O, which shows the thread ridge 18 of the external thread in the leading portion 24. This embodiment is different from the above-described embodiments with respect to a sharp crest 70 provided in the top portion of the thread ridge 18. That is, as the above-described sharp crest 40, the sharp crest 70 is defined by the side surfaces 42, 44 whose inclination angles β1, β2 are equal to each other (β1=β2). However, the top end portion 46 is located in a position that is offset from the center line S of the thread ridge 18 toward the leading flank 30, i.e., a distal end of the tap 10 in the direction of the axis O. In this arrangement, too, when the internal thread is machined with the thread ridge 18 being caused to bite into the inner-wall-surface layer portion of the prepared hole of the workpiece, a rate of flow of displaced material (metal) of the inner-wall-surface layer portion on a side of the side surface 42 and that on a side of the side surface 44 are made different from each other so that it is possible to adjust the thrust load during the tapping operation. It is noted that the position of the top end portion 46 may be offset from the center line S of the thread ridge 18 toward the trailing flank 32. In the sharp crest 60 shown in FIG. 11, too, the top end portion 66 may be located in a position offset from the center line S of the thread ridge 18.

Figure 13:
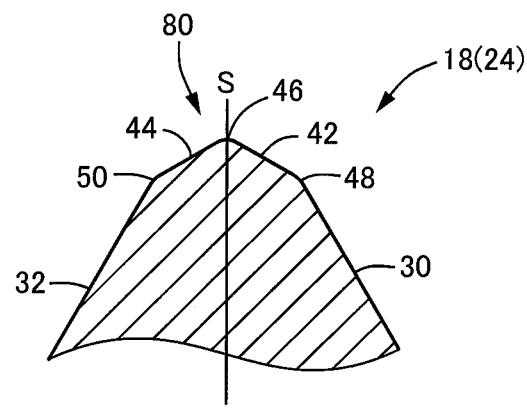
FIG. 13 is a view for explaining still another embodiment of the present invention, and is a cross sectional view corresponding to FIG. 4 and showing, in enlargement, a sharp crest and its vicinity.

FIG. 13 is a view corresponding to FIG. 4, namely, a view of a cross section parallel to the axis O, which shows the thread ridge 18 of the external thread in the leading portion 24, particularly, shows, in enlargement, the top portion of the thread ridge 18, i.e., a sharp crest 80 and its vicinity. The sharp crest 80 has basically substantially the same cross sectional shape as the sharp crest 40 in the above-described embodiment, and is defined by the side surfaces 42, 44 whose inclination angles β1, β2 are equal to each other (β1=β2). However, each of the top end portion 46 and the connection portions 48, 50 is rounded by a certain amount in the cross section shown in FIG. 13. In this arrangement, a strength of each of the top end portion 46 and the connection portions 48, 50 is increased whereby breakage or the like is restrained. Where the top end portion 46 is rounded by a large amount, when the thread ridge 18 is caused to bite into the inner-wall-surface layer portion of the prepared hole of the workpiece, a resistance acting against the thread ridge 18 is increased whereby tapping torque is increased thereby causing a risk that the tool life could be reduced. Therefore, a size of round (such as radius and range) is determined by taking account of, for example, the internal angle of the top end portion 46 such that a certain degree of tool life can be obtained. The size of the round is determined such that a condition is satisfied wherein the condition is that the sharp crest 80 necessarily has the side surfaces 42, 44 each of which is represented by a straight line in the cross section parallel to the axis O. In the other sharp crests 60, 70, too, the top end portions 66, 46 and the connection portions (through which the side surfaces are connected to the respective flanks 30, 32) may be rounded.

Figure 14:
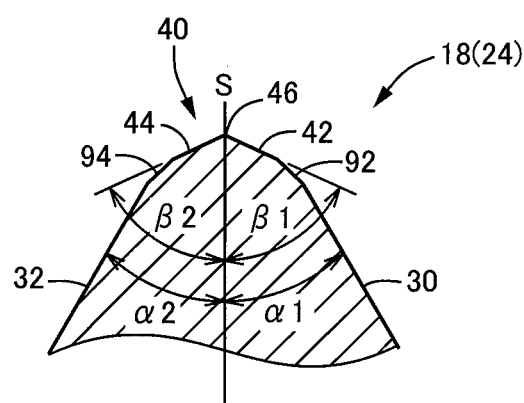
FIG. 14 is a view for explaining still another embodiment of the present invention, and is a cross sectional view corresponding to FIG. 4 and showing, in enlargement, the sharp crest and its vicinity.

FIG. 14 is a view corresponding to FIG. 4, namely, a view of a cross section parallel to the axis O, which shows the thread ridge 18 of the external thread in the leading portion 24, particularly, shows, in enlargement, the top portion of the thread ridge 18, i.e., the sharp crest 40 and its vicinity. In this embodiment, each of inclined surfaces 92, 94 is provided between a corresponding one of the flanks 30, 32 and a corresponding one of the side surfaces 42, 44 of the sharp crest 40. The inclined surface 92 is inclined by an inclination angle which is larger than the flank angle α1 and which is smaller than the inclination angle β1, such that the inclination angle of the inclined surface 92 is gradually increased in a direction away from the leading flank 30 toward the top end portion 46. The inclined surface 94 is inclined by an inclination angle which is larger than the flank angle α2 and which is smaller than the inclination angle β2, such that the inclination angle of the inclined surface 94 is gradually increased in a direction away from the tailing flank 32 toward the top end portion 46. In the other embodiments, too, inclined surfaces having intermediate inclination angles may be provided between a corresponding one of the sharp crests 60, 70, 80 and the flanks 30, 32. Further, it is also possible to provide inclined surfaces each of which is bent in two or more steps.

Figure 15:
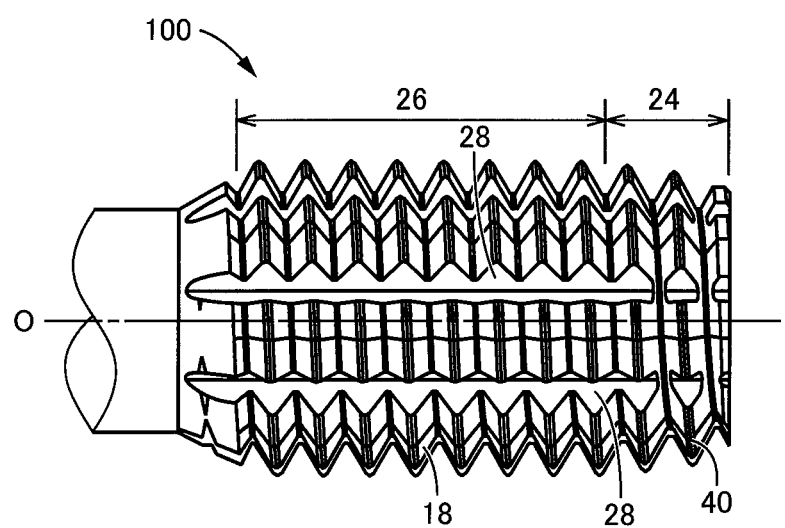
FIG. 15 is a view for explaining still another embodiment of the present invention, and is a front view corresponding to FIG. 2 and showing the thread portion.

FIG. 15 is a view corresponding to FIG. 2, namely, a front view showing a thread portion 100 in enlargement. The thread portion 100 is the same as the above-described thread portion 16 in that the thread portion 100 includes the leading portion 24 and the complete thread portion 26 and in that the sharp crest 40 is provided in the top portion of the thread ridge 18 of the external thread in the leading portion 24. However, in the thread portion 100, the sharp crest 40 is provided in the top portion of the thread ridge 18 of the external thread also in the complete thread portion 26. In this case, since a V-shaped groove corresponding to the shape of the sharp crest 40 is formed in the root of the machined internal thread, the root may be formed to a desired shape by a cutting or grinding operation, for example, as needed, after the tapping operation.

While the embodiments of the present invention have been described by reference to the accompanying drawings, it is to be understood that the invention is applicable to other forms in a range without departing from the spirit of the invention.

DESCRIPTION OF REFERENCE SIGNS

10: thread forming tap 16, 100: thread portion (external thread) 18: thread ridge 20: protruding portion 22: relieved portion 24: leading portion 26: complete thread portion 30: leading flank 32: trailing flank 40, 60, 70, 80: sharp crest 42, 44, 62, 64: side surface 46, 66: top end portion O: axis α1, α2: flank angle β1, β2: inclination angle

The invention claimed is:

1. A thread forming tap comprising a complete thread portion and a leading portion which is provided to be contiguous with the complete thread portion and which has a diameter reduced in a direction toward a distal end of the thread forming tap, such that the complete thread portion and the leading portion are provided with an external thread in which protruding portions and relieved portions are alternately formed, and such that a thread ridge of the external thread has a cross sectional shape corresponding to a shape of a valley of an internal thread that is to be formed, and extends along a helix having a lead angle of the internal thread,
wherein the thread ridge of the external thread has, in an axial cross section that is parallel to an axis of the thread forming tap, a triangular shape as the cross sectional shape that is defined by a pair of flanks located on respective opposite sides in a direction of the axis, such that each of the flanks is inclined by a predetermined flank angle corresponding to a shape of a valley of the internal thread;
wherein a crest is provided in a top portion of the thread ridge at least in the leading portion, and has, in the axial cross section, a triangular shape that is defined by a pair of side surfaces located on respective opposite sides in the direction of the axis, such that each of the side surfaces is inclined by an inclination angle that is larger than the flank angle, each of the side surfaces extending in a straight line from a corresponding one of the flanks to a top end portion of the crest; and
wherein the inclination angle of each of the side surfaces of the crest is within a range from 40° to 80°, the inclination angle of each of the side surfaces being an angle between (i) a corresponding one of the side surfaces and (ii) a line perpendicular to the axis.

2. The thread forming tap according to claim 1, wherein the side surfaces of the crest intersect with each other in the top end portion of the crest, and
wherein an internal angle of the top end portion is within a range from 80° to 160°.

3. The thread forming tap according to claim 1, wherein the inclination angle of one of the side surfaces of the crest and the inclination angle of the other of the side surfaces of the crest are equal to each other.

4. The thread forming tap according to claim 1, wherein the side surfaces of the crest are connected directly to the flanks, respectively.

5. The thread forming tap according to claim 1, wherein the side surfaces of the crest intersect with each other in the top end portion of the crest, and
wherein the top end portion is rounded in the axial cross section.

6. The thread forming tap according to claim 1, wherein the crest is provided in the thread ridge exclusively in the leading portion, and
wherein a crest of the thread ridge in the complete thread portion has a shape corresponding to a shape of a root of the internal thread.

7. The thread forming tap according to claim 1, wherein the top end portion of the crest is located in a position offset in the direction of the axis from a center line of the thread ridge toward a distal end or a proximal end of the thread forming tap.

8. The thread forming tap according to claim 1, wherein a height of the thread ridge of the external thread at least in the complete thread portion is constant in a direction of the helix along which the thread ridge extends.

* * * * *